US008296737B2

(12) United States Patent
Carteri et al.

(10) Patent No.: US 8,296,737 B2
(45) Date of Patent: Oct. 23, 2012

(54) COMPUTER PROGRAM FOR TRACING IMPACT OF ERRORS IN SOFTWARE APPLICATIONS

(75) Inventors: Francesco Carteri, Rome (IT); Francesco Carusi, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1391 days.

(21) Appl. No.: 11/933,464

(22) Filed: Nov. 1, 2007

(65) Prior Publication Data
US 2008/0109791 A1 May 8, 2008

(30) Foreign Application Priority Data
Nov. 3, 2006 (EP) .................................. 06123469

(51) Int. Cl.
*G06F 9/44* (2006.01)
(52) U.S. Cl. ..................... 717/125; 717/105; 717/131
(58) Field of Classification Search .................. None
See application file for complete search history.

(56) References Cited

U.S. PATENT DOCUMENTS

| | | | | |
|---|---|---|---|---|
| 6,668,370 B1 * | 12/2003 | Harmon et al. | ............... | 717/125 |
| 7,120,896 B2 * | 10/2006 | Budhiraja et al. | ............ | 717/105 |
| 7,219,328 B2 * | 5/2007 | Schloegel et al. | ............. | 717/104 |
| 7,739,655 B1 * | 6/2010 | Monteiro et al. | ............. | 717/105 |
| 7,814,463 B2 * | 10/2010 | Dandoy | ........................ | 717/125 |
| 7,870,540 B2 * | 1/2011 | Zare et al. | ...................... | 717/125 |
| 7,890,924 B2 * | 2/2011 | Raffo | ............................. | 717/105 |
| 7,958,486 B2 * | 6/2011 | Tsyganskiy et al. | .......... | 717/125 |
| 8,001,527 B1 * | 8/2011 | Qureshi et al. | ................ | 717/131 |
| 8,056,050 B2 * | 11/2011 | Kuester et al. | ................ | 717/105 |
| 2002/0112225 A1 * | 8/2002 | Charisius et al. | ............. | 717/125 |
| 2002/0199173 A1 * | 12/2002 | Bowen | .......................... | 717/131 |
| 2003/0028858 A1 * | 2/2003 | Hines | .............................. | 717/125 |
| 2003/0046668 A1 * | 3/2003 | Bowen | .......................... | 717/131 |
| 2004/0111702 A1 * | 6/2004 | Chan | ............................. | 717/105 |
| 2008/0059945 A1 * | 3/2008 | Sauer et al. | ..................... | 717/105 |

OTHER PUBLICATIONS

Alexander Stuckernholz; Component updates as a Boolean Optimization Problem; 2006; [retrieved online on Jun. 14, 2012]; pp. 1-14. Retrieved from Internet: <URL: http://www.iist.unu.edu/www/docs/techreports/reports_old/report344/06-Stuckenholz.pdf>.*

(Continued)

*Primary Examiner* — Thuy Dao
*Assistant Examiner* — Hanh T Bui
(74) *Attorney, Agent, or Firm* — Yee & Associates, P.C.; Jeffrey S. LaBaw

(57) ABSTRACT

A solution for managing errors in software applications is proposed. Typically, the software application is represented (during its analysis and design phases) by means of different models—for example, of the UML type. The same models are also exploited to represent the impact of any errors in the software application. For this purpose, during the analysis and design phase, it gets determined the artifacts of the models that are directly impacted by each error (since it occurred in an object that participates in their implementation); the artifacts correlated thereto either directly or indirectly—are set as indirectly impacted by the error. It is then possible to display a diagram corresponding to the model, with the directly and indirectly impacted artifacts that are highlighted with different colors.

15 Claims, 8 Drawing Sheets

OTHER PUBLICATIONS

Lionel C. Briand et al.; A Comprehensive Evaluation of Capture-Recapture Models for Estimating Software Defect Content; Jun. 2000; [retrieved online on Jun. 14, 2012]; pp. 1-23; Retrieved from Internet: <URL: http://ieeexplore.ieee.org/stamp/stamp.jsp>.*

Yannis Smaragdakis et al.; Scalable Automatic Test Data Generation from Modeling Diagrams; 2007; [retrieved online on Jun. 14, 2012]; pp. 1-10; Retrieved from Internet: <URL: http://delivery.acm.org/10.1145/1330000/1321635/p4-smaragdakis.pdf>.*

* cited by examiner

COMPUTER PROGRAM FOR TRACING IMPACT OF ERRORS IN SOFTWARE APPLICATIONS

FIELD OF THE INVENTION

The present invention relates to the information technology field. More specifically, the invention relates to the management of errors in software applications.

BACKGROUND ART

The management of software applications is a very complex process. This is particularly true for large software applications, especially when they are intended to run in heterogeneous network environments or have multi-layer structures.

More in detail, the process of managing each software application involves a number of different activities. For example, the building of the software application starts with an analysis phase for the collection of its requirements. The analysis phase is then followed by a design phase for the corresponding architectural definition. Afterwards, it is possible to implement the actual code of the software application during a corresponding development phase. The software application so obtained is generally subjected to a test phase for verifying its correct operation. Once an acceptable level of confidence has been obtained, the software application is deployed into a production environment. During its life cycle, the software application is further subjected to maintenance operations. Particularly, patches (of fixes) are continuously applied to correct corresponding errors temporarily. Periodically, new versions or releases of the software application (incorporating all the available patches and providing new functions) are installed. In any case, the software application must be reconfigured whenever its operative parameters change.

Some tools are available to facilitate some activities of the above-described management process. For example, modeling tools are extensively used during the analysis and design phases. Those tools allow simplifying the representation of different aspects of the software application by means of models (for example, of the UML type), which provide an abstraction of real components to be built; in this way, it is possible to visualize, assess and communicate the software application before its actual implementation (so as to reduce the risks of the corresponding development). Generally, the modeling tools provide an Integrated Development Environment (IDE) which also facilitates the generation of the corresponding code. A very popular example of commercial modeling tool is the "Rational Rose" by IBM Corporation.

However, other phases of the management process still remain substantial manual tasks. Particularly, the activities relating to the management of the errors in the software application are based on an investigation process, which requires a heavy intervention of a system administrator. Indeed, the collection of the errors, their analysis, the corresponding reporting, and the planning of the required correction actions are completely in charge of the system administrator.

Therefore, the quality of the above-described error management process strongly depends on the skill of the system administrator; in any case, the obtained results are not repeatable and prone to errors.

Moreover, the documentation of any activities relating to the error management process is completely unstructured (for example, being based on a specification in prose). This makes it very difficult to convey and/or share any desired information.

The above-mentioned drawbacks also have a detrimental impact on the optimal allocation of the resources that are available for correcting the errors. Indeed, it is very difficult (if not impossible) for the system administrator to decide how to prioritize the errors for their correction.

All of the above may have deleterious effects on business aspects related to the software application (for example, when the correction of errors impacting critical business areas is delayed).

SUMMARY OF THE INVENTION

The present invention provides a solution for managing errors in software applications. The invention models a software application with a set of models including a plurality of artifacts, each one modeling an aspect of the software application, and a plurality of correlations among the artifacts. The software application is implemented according to the models, the software application including a plurality of modules each one participating in the implementation of at least one of the artifacts. When an error is detected in a failing one of the modules, each artifact implementation is provided by the failing module is set as directly impacted by the error. Each artifact being correlated in the models with at least one directly impacted and/or indirectly impacted artifact is set as impacted. A representation of the models is displayed with an identification of each directly impacted artifact and each indirectly impacted artifact.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1A:
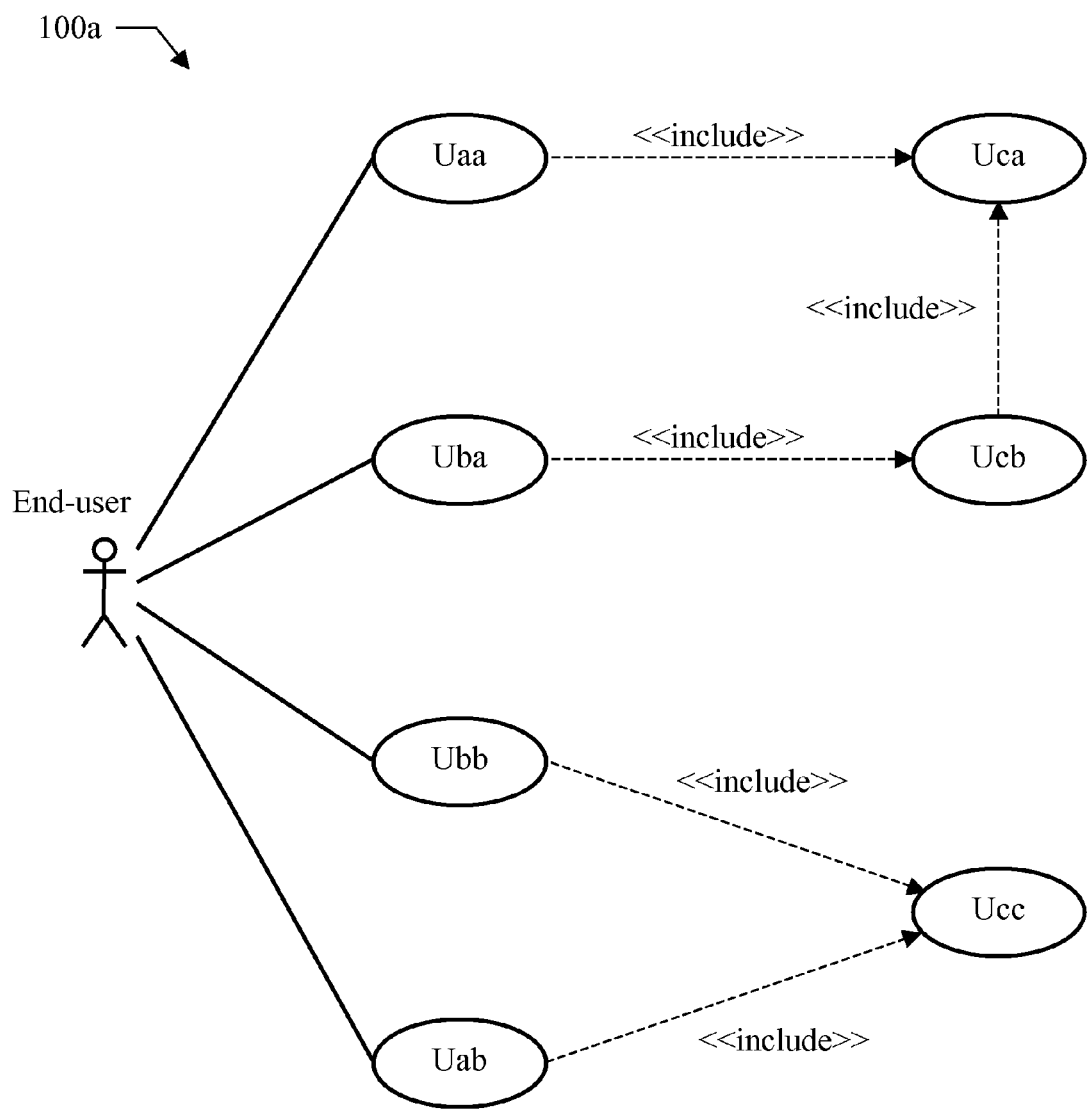
FIGS. 1a-1c show different modeling diagrams that may be used to implement the solution according to an embodiment of the invention.
Figure 1B:
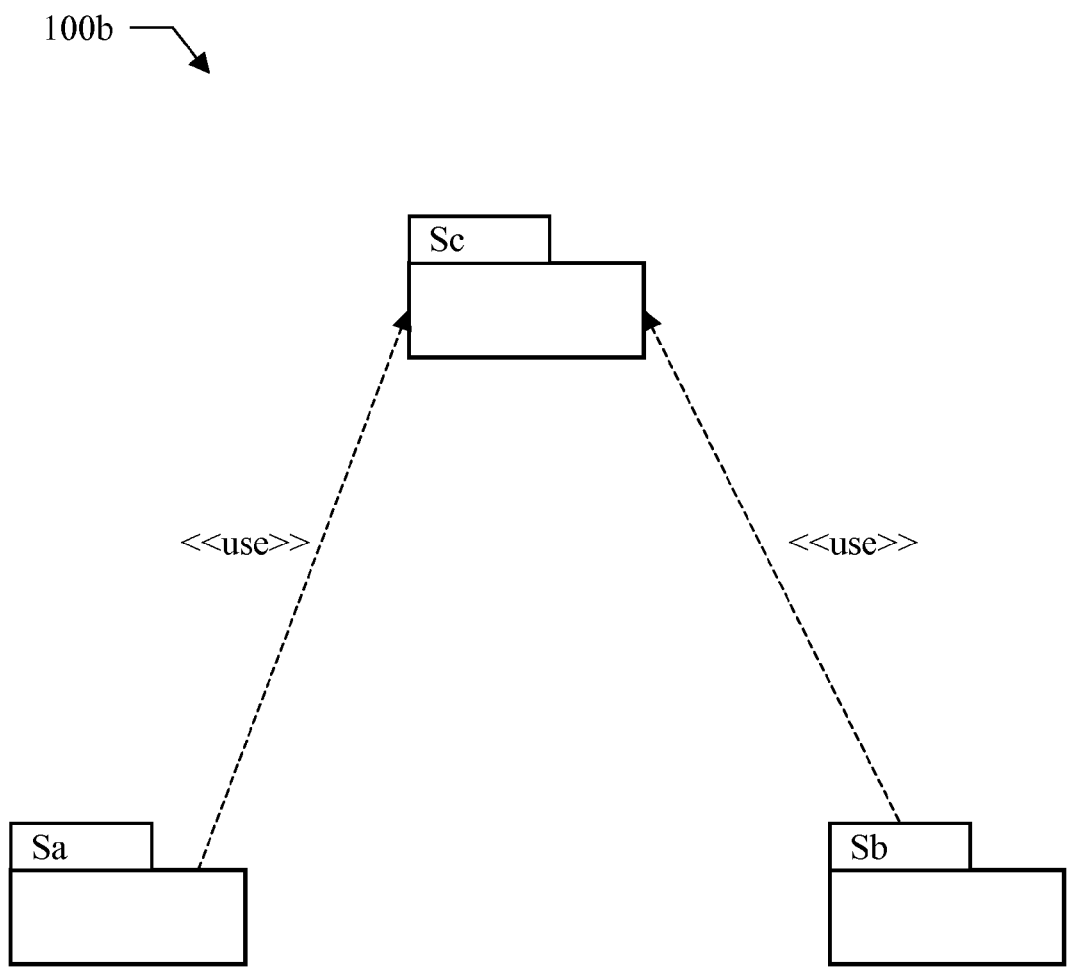
Figure 1C:
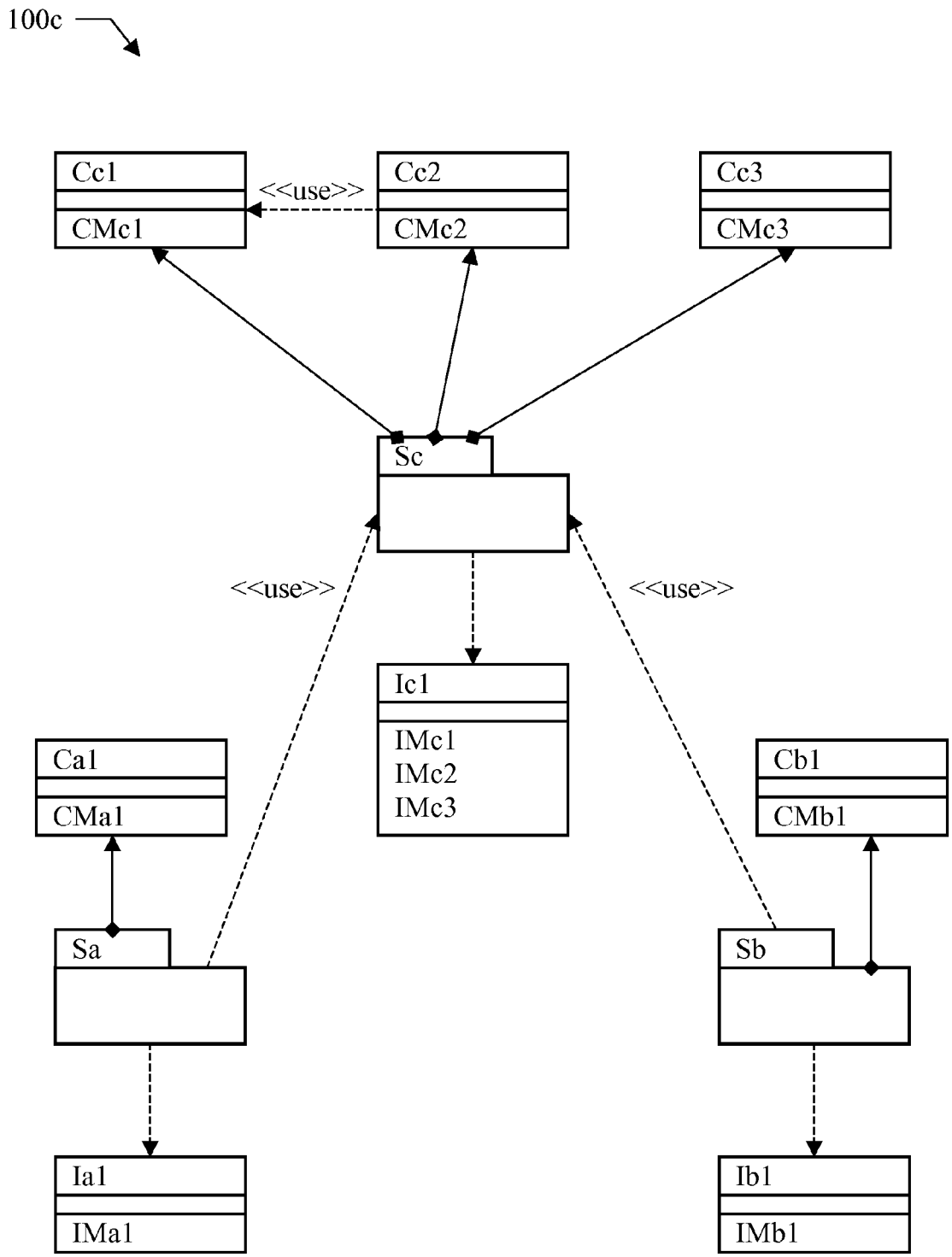

With reference in particular to FIGS. 1a-1c, different very simplified models that may be used to represent an exemplary software application are illustrated. Each model includes a number of artifacts, which abstract corresponding aspects; the model also allow specifying different correlations among those artifacts. Preferably, the models are defined by using the Unified Modeling Language (UML); the UML is a standard modeling language, which provides the syntax and the underlying semantic for modeling software applications (especially of the object-oriented type). Each model is typically represented graphically by one or more diagrams (defined by the UML language as well).

Particularly, FIG. 1a shows a use case diagram 100a resulting from an analysis phase of the software application. The use case diagram 10a provides a high level specification of any interactions of users with the software application by means of a set of use cases; each use case represents a scenario that encompasses a sequence of steps being performed to accomplish a specific goal.

In detail, an actor plays the role of an End-user, or an external interacting system, of the software application. The End-user carries out four different use cases, denoted with Uaa, Uba, Ubb and Uab (as indicated by corresponding associations). The use case Uaa includes a use case Uca—as indicated by a corresponding dependency, represented with a dashed-line arrow, meaning that the (source) use case Uaa includes the behavior of the (target) use case Uba. Likewise, the use case Uba includes a use case Ucb, which in turn includes the use case Uca. At the end, both the use case Ubb and the use case Uab include a use case Ucc.

Moving now to FIG. 1b, a class diagram 100b is obtained from the above-described use case diagram during a design phase of the software application. The class diagram 100b provides a static representation of the software application by means of its classes and their interaction; each class represents an entity of the software application that encapsulates certain functionality.

In the example at issue, the class diagram 100b provides a high-level representation of the software application by means of packages implementing the required use cases; each package (represented by a tabbed folder) groups together more classes correlated to each other. Particularly, a package Sa implements the use cases Uaa and Uab; likewise, a package Sb implements the use cases Uba and Ubb, while a package Sc implements the use cases Uca, Ucb and Ucc (of FIG. 1a). Both the package Sa and the package Sb use the package Sc—as indicated by corresponding associations, represented with dashed-line arrows, meaning that each (source) package Sa, Sb invokes specific functions of the (target) package Sc.

With reference now to FIG. 1c, the (high-level) class diagram 100b is expanded into a low-level class diagram 100c. The class diagram 100c details each package Sa, Sb, Sc by means of the corresponding classes; each class provides specific attributes (defining its properties) and methods (exposing functions available to other classes). Variations of the classes are interfaces, which only provide the definition of specific methods for their implementation by other classes. Each class (including the interfaces) is represented with a rectangle, which is split into three frames for its name, attributes, and methods, respectively.

More specifically, the package Sa realizes an interface Ia1—as indicated by a corresponding association, represented with a dashed-line arrow, meaning that the (source) package Sa implements the functionality defined by the (target) interface Sa1; the interface Ia1 exposes a method IMa1. The package Sa is formed by a class Ca1—as indicated by a corresponding aggregation, represented with an arrow starting with a diamond, meaning that the (source) package Sa has the (target) class Ca1; the class Ca1 exposes a method CMa1, which implements the method IMa1 of the interface Ia1. Likewise, the package Sb realizes an interface Ib1, which exposes a method IMb1; the package Sb is formed by a class Cb1, which exposes a method CMb1 implementing the method IMb1 of the interface Ib1. Moreover, the package Sc realizes an interface Ic1, which exposes three methods IMc1, IMc2 and IMc3; the package Sc is formed by a class Cc1 (exposing a method CMc1 that implements the method IMc1 of the interface Ic1), a class Cc2 (exposing a method CMc2 that implements the method IMc2 of the interface Ic1), and a class Cc3 (exposing a method CMc3 that implements the method IMc3 of the interface Ic1). The class Cc2 in turn uses the class Cc1.

The analysis and design phases are then followed by a development phase, wherein the software application is actually built starting from the provided models. In the example at issue, the software application is obtained by writing code that implements the above-described classes Ca1, Cb1, Cc1, Cc2, Cc3 in an object-oriented language (such as Java); the software application will then consist of different objects, each one being an instance of an available class.

In the solution according to an embodiment of the present invention, as described in detail in the following, the same models are also used to represent the impact of any error in the software application. More specifically, each error occurs in an object of the software application (hereinafter referred to as failing object). Therefore, each artifact (i.e., class, package or use case in the example at issue) which implementation is participated by the failing object is set as directly impacted by the error. At the same time, each artifact that is correlated to the directly impacted artifact is set as indirectly impacted by the error; the correlation can be either specifically with the directly impacted artifact or through one or more other indirectly impacted artifacts.

Figure 2A:
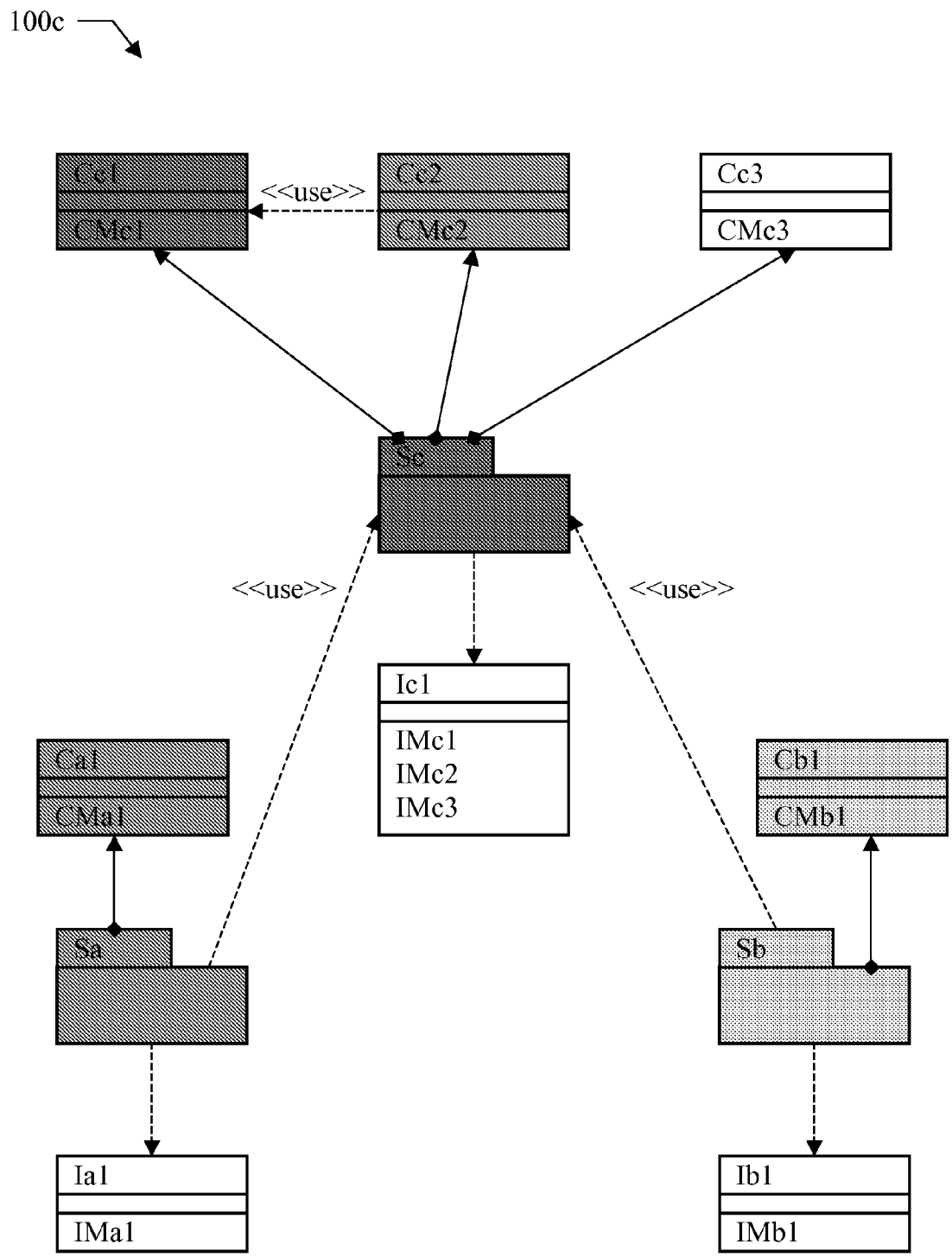
FIGS. 2a-2c show an exemplary application of the solution according to an embodiment of the invention on those modeling diagrams.

For example, with reference to the low-level class diagram 100c repeated in FIG. 2a, let us assume that the error occurred in the (failing) method Cmc1 of the failing object instantiating the class Cc1. In this case, the class Cc1 is directly impacted by the error—since the failing object implements it; the package Sc as well is directly impacted by the error— since it is formed by the directly impacted class Cc1. At the same time, the class Cc2 is indirectly impacted by the error— since it uses the method CMc1 of the directly impacted class Cc1. Likewise, the package Sa with the class Cb1 (forming it) as well as the package Sb with the class Sb1 (forming it) are indirectly impacted by the error (since all of them use the directly impacted package Sc).

The proposed solution strongly facilitates the management of the errors in the software application. Particularly, the representation of the impact of the errors in the models provides a useful support for a system administrator; for example, this aids the system administrator in the analysis of the errors, the corresponding reporting, and the planning of the required correction actions.

All of the above makes the process of managing the errors in the software application less dependent on personal skills; this has a beneficial impact on the quality of the corresponding results.

Moreover, the obtained documentation is well suited to convey and/or share the desired information.

The above-mentioned advantages improve the allocation of the resources that are available for correcting the errors, which resources may now be exploited at their best according to different priorities.

In any case, the proposed solution allows limiting the negative effects of the errors on business aspects related to the software application (for example, by immediately identifying and correcting any errors that impact critical business areas).

Advantageously, the (directly and indirectly) impacted artifacts are highlighted in the diagrams representing the relevant models. For example, as shown in the figure, the directly impacted artifacts Cc1, Sc are represented with a dark background; on the other hand, the indirectly impacted artifacts Cc1, Sa, Ca1, Sb, Cb1 are represented with a light background. Preferably, different colors are used for this purpose; for example, the directly impacted artifacts Cc1, Sc are colored in red, while the indirectly impacted artifacts Cc1, Sa, Ca1, Sb, Cb1 are colored in yellow.

This feature improves the visual representation of the directly/indirectly impacted artifacts (thereby facilitating the identification of the impact of the error in the software application).

In addition, it is also possible to assign an indirection index to each indirectly impacted artifact, according to its distance from the directly impacted artifact(s). For example, the indirection index is given by the number of correlations that are required to reach the closest directly impacted artifact—through any other indirectly impacted artifact (starting from 1 when the indirectly impacted object is immediately correlated to a directly impacted object). This indirection index provides a quantitative indication of the level of impact of the error.

Preferably, the indirectly impacted artifacts are differentiated in the diagrams representing the relevant models according to their indirection indexes. For example, let us assume that the class Ca1 uses the failing method CMc1 of the directly impacted class Cc1; in this case, the indirection index of the indirectly impacted class Ca1 will be equal to 1. Conversely, if the class Cb1 uses the method CMc2 of the indirectly impacted class Cc2 (which in turn uses the failing method CMc1 of the directly impacted class Cc1) the indirection index of the indirectly impacted class Cb1 will be equal to 2. In this case, the indirectly impacted artifacts Cc2, Ca1, Sa and Cb1, Sb are represented with different intensities of their background (such as with the higher the indirection index the lighter the background). Preferably, when a color representation is used, it is possible to provide different shades (of the yellow in the example at issue) for corresponding indirection indexes.

Figure 2B:
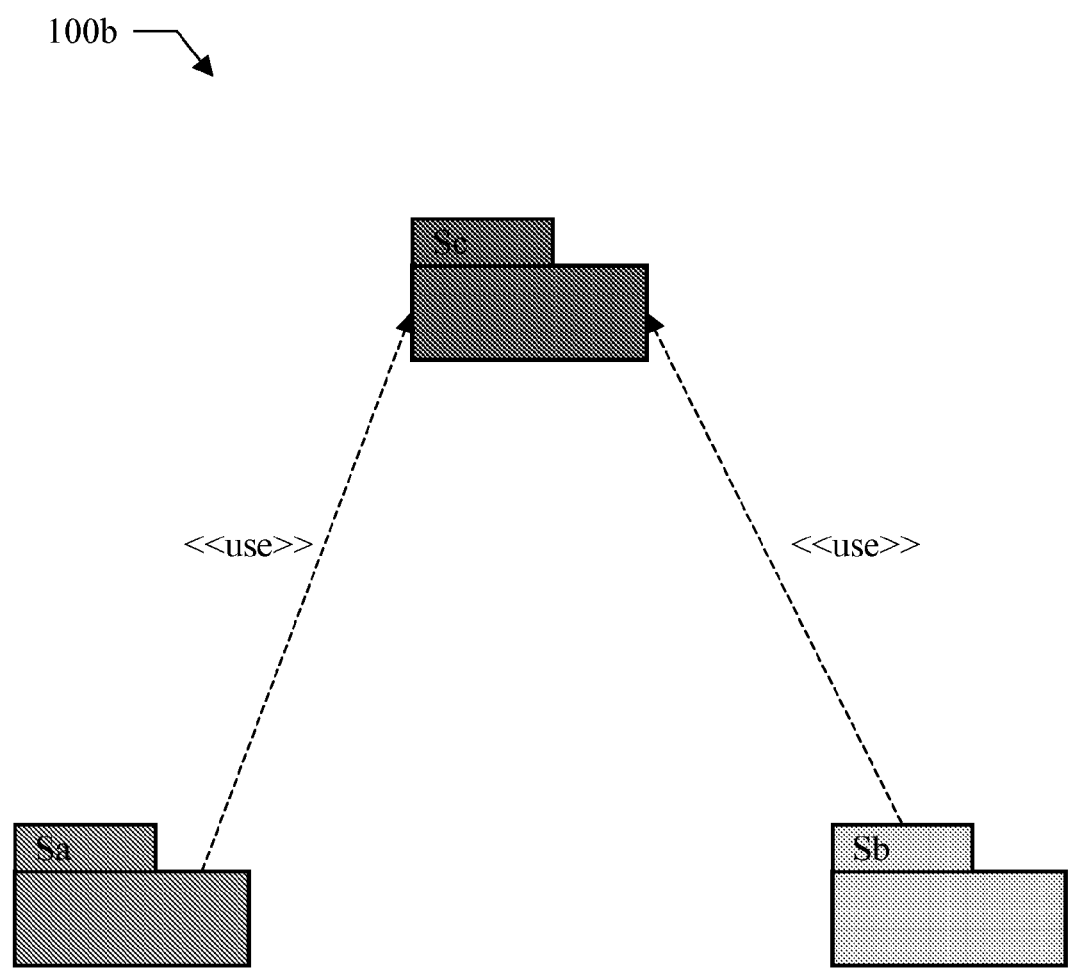

The same process may also be applied to all the other models of the software application. For example, considering the high-level class diagram 100b repeated in FIG. 2b, the directly impacted package Sc (implemented by the failing object) is represented with a dark background; on the other hand, the indirectly impacted package Sa is represented with a light background (indirection index equal to 1), while the indirectly impacted package Sb is represented with a still lighter background (indirection index equal to 2).

Figure 2C:
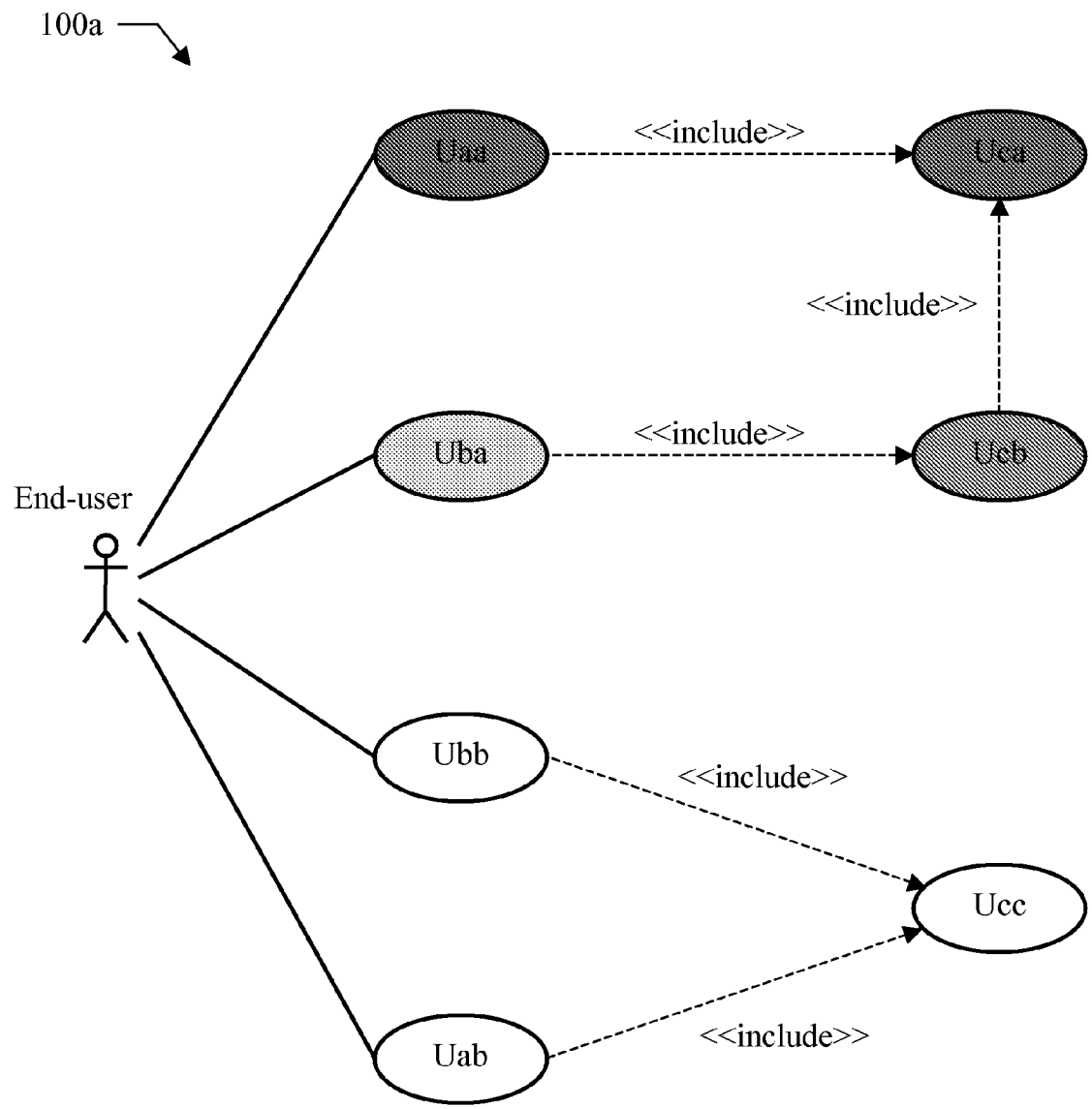

Going back to the use case diagram 100a repeated in FIG. 2c, let us assume that the class Cc1 participates in the implementation of the use cases Uaa and Uca. In this case, the use cases Uaa, Uca are directly impacted by the error in the failing method CMc1 (and then are represented with the dark background). At the same time, the use case Ucb is indirectly impacted by the error—since it includes the directly impacted use case Uca; therefore, the indirectly impacted use case Ucb is represented with a light background (indirection index equal to 1). Moreover, the use case Uba is indirectly impacted as well by the error since it includes the indirectly impacted use case Ucb; therefore, the indirectly impacted use case Ucb is represented with a still lighter background (indirection index equal to 2).

The information provided by the above-described solution may also be used to implement a quantitative analysis of the impact of the error in the software application. For example, it is possible to assign a weight to each artifact—according to its importance from a business point of view (for example, from 0 when the modeled aspect is irrelevant for the operation of the software application to 100 when the modeled aspect is vital). The impact of the error for the different aspects of the software application may be quantified by calculating a criticality index for each artifact. For example, this result may be achieved by multiplying the weight of the artifact by a correction factor; the correction factor is set to 1 when the artifact is directly impacted by the error and to 0 when the artifact is not impacted by the error; intermediate values between 0 and 1 are used when the artifact is indirectly impacted by the error (for example, 0.5 for the indirection index 1, 0.25 for the indirection index 2, 0.125 for the indirection index 3, and so on). It is also possible to assign a global criticality index to the error as a whole—such as equal to the sum of the criticality indexes of all the artifacts or to their average. This information allows ordering the errors automatically from the most critical to the least critical. In this way, it is also possible to implement an algorithm for scheduling their treatment (for example, by assigning different priorities to the errors according to their criticality) and/or for managing the allocation of the available resources.

Figure 3:
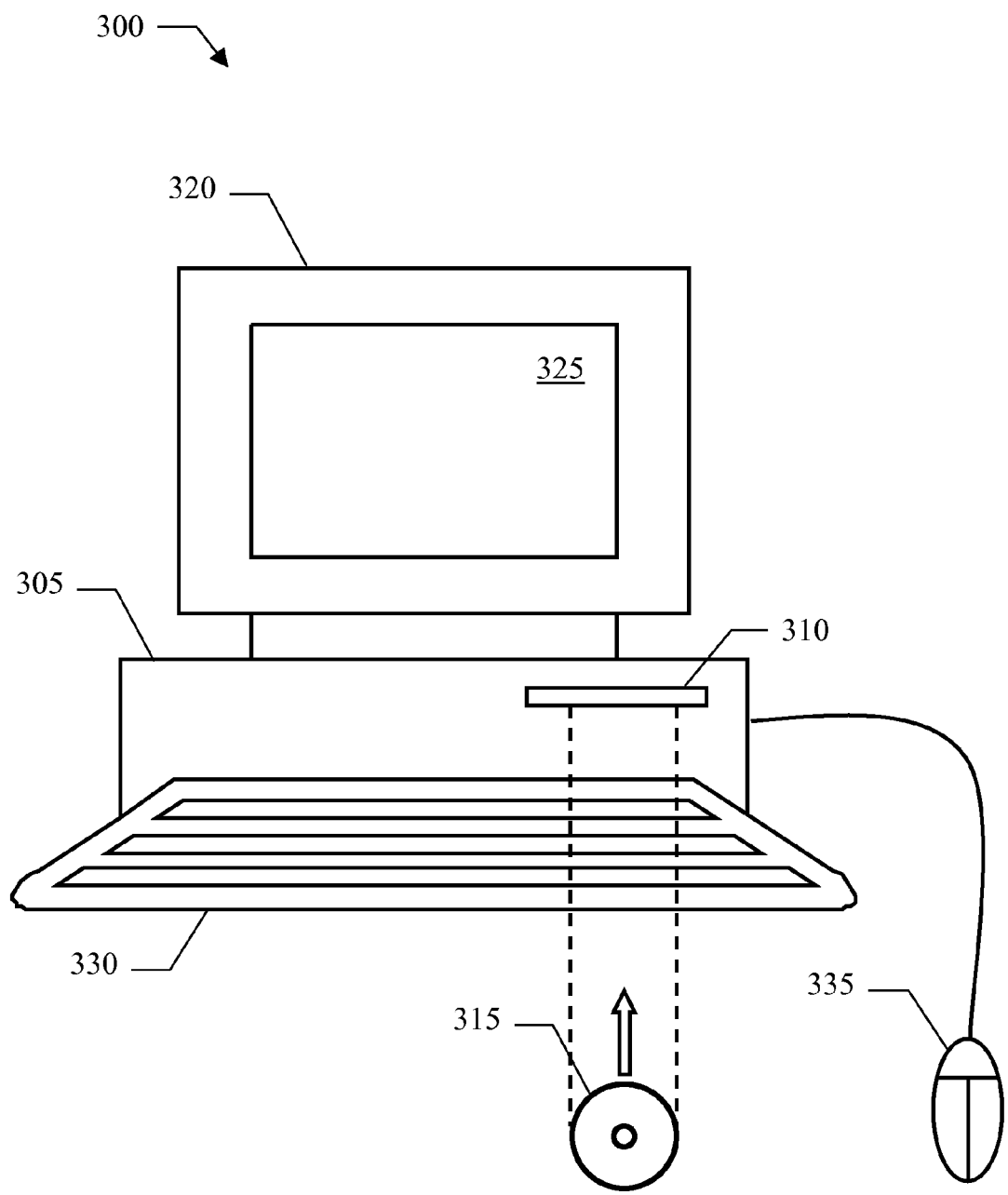
FIG. 3 is a pictorial representation of a computer that may be used to implement the solution according to an embodiment of the invention.
Figure 4:
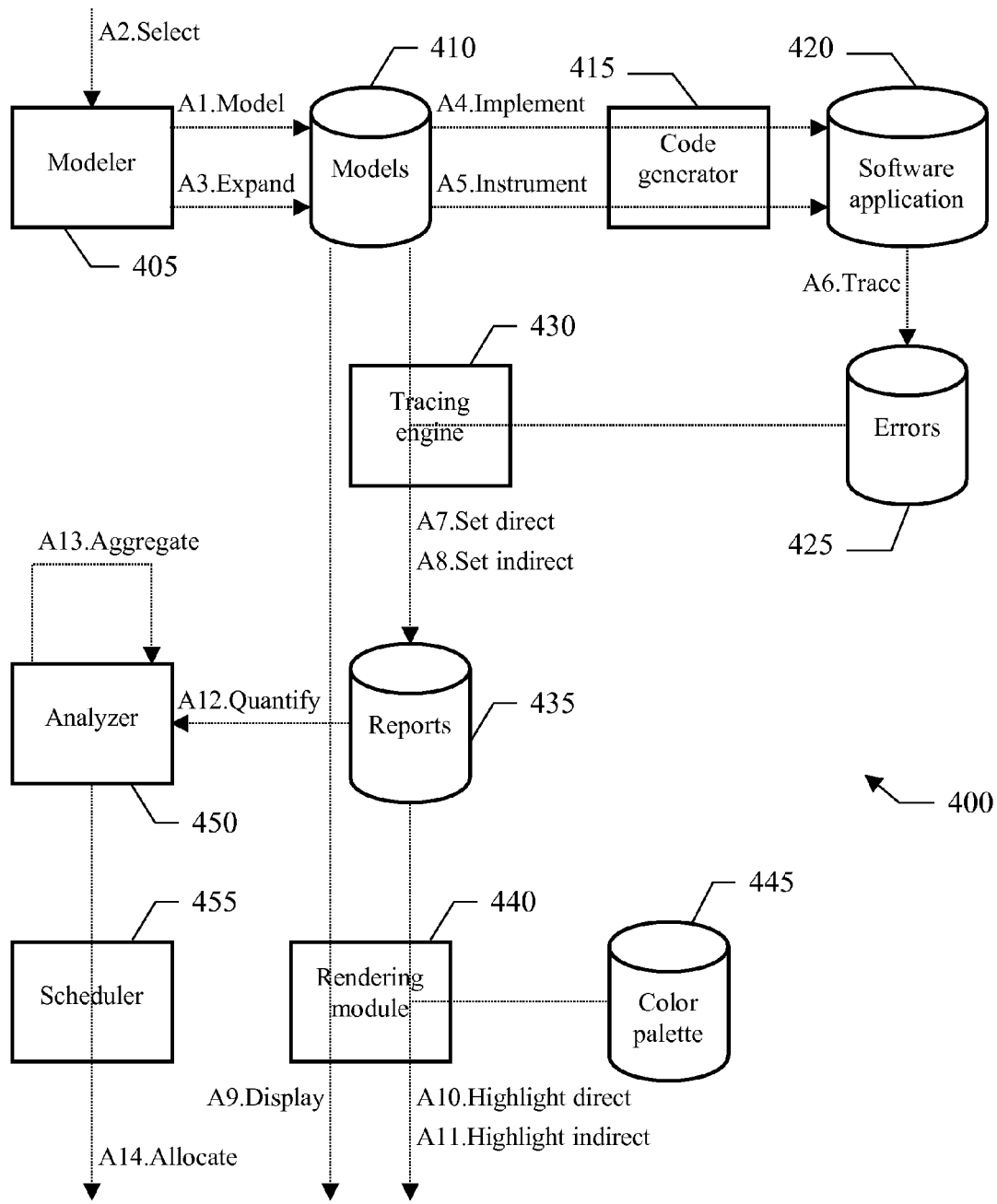
FIG. 4 is a collaboration diagram representing the roles of different software modules implementing the solution according to an embodiment of the invention.

With reference now to FIG. 3, the above-described management process is implemented on a computer 300 (for example, a PC). The computer 300 consists of a central unit 305, which houses the electronic circuits controlling its operation (such as a microprocessor and a working memory). The computer 300 is also provided with a hard-disk and a drive 310 for reading CD-ROMs 315. A monitor 320 is used to display images on a screen 325. Operation of the computer 300 is controlled by means of a keyboard 330 and a mouse 335, which are connected to the central unit 305 in a conventional manner. Moving now to FIG. 4, the main software modules that run on the above-described computer are denoted as a whole with the reference 400. The information (programs and data) is typically stored on the hard-disk and loaded (at least partially) into the working memory of the computer when the programs are running. The programs are initially installed onto the hard disk, for example, from CD-ROM. Particularly, the figure describes the static structure of the system (by means of the corresponding modules) and its dynamic behavior (by means of a series of exchanged messages).

Particularly, a modeler 405 (such as the above-mentioned "Rational Rose") is used by an analyst or a designer to define a series of models for each software application to be built. Typically, the modeler 405 provides a graphical user interface that allows creating, editing, viewing, and performing any other management operations on the diagrams representing the desired models. The definitions of the models are saved into a repository 410, for example, by means of corresponding files in the XML Metadata Interchange (XMI) format (action "A1.Model"). In this phase, the analyst/designer selects any artifact (i.e., classes, packages, use cases), which errors should be traced (action "A2.Select"). For this purpose, the analyst/designer can select the desired artifact directly (for example, by dragging a tracing icon onto it). Alternatively, the analyst/designer can select a (parent) artifact that collects one or more artifacts being dependent thereon; in this case, the selected parent artifact is automatically expanded into the collected dependent artifacts, so as to apply the selection to all of them (action "A3.Expand"). In both cases, the selected artifacts are flagged in the repository 410. In this way, it is possible to apply the proposed solution selectively (for example, only with respect to specific aspects of the software application of particular relevance). Particularly, the above-described automatic expansion of the parent artifacts strongly facilitates the selection of the desired artifacts (for example, for specific areas of interest).

A code generator 415 is used by a developer to actual build each desired software application 420 implementing the corresponding models (action "A4.Implement"). In this phase, the code generator 415 automatically instruments each class (participating in the implementation of a selected artifact) for the desired tracing—for example, by extending it with a dedicated method (action "A5.Instrument").

During the life cycle of the software application 420, whenever an error occurs in an object instantiating an instrumented class a corresponding error message is returned (by a logger, not shown in the figure); for example, the error message includes a timestamp, an error code, the name of the class instantiated by the failing object, the name of the failing method, and a descriptive message. All the returned error messages are saved into a log 425 (action "A6.Trace").

A tracing engine 430 accesses the model repository 410 and the error log 425. For each error, the tracing engine 430 determines all the directly impacted artifacts in the corresponding models (action "A7.Set direct"). Moreover, the tracing engine 430 also determines all the indirectly impacted artifacts in the same models (action "A8.Set indirect"); in this phase, for each indirectly impacted artifact, the tracing engine 430 also determines the corresponding indirection index. The information so obtained defines a corresponding report (for example, in the XMI format), which is saved into a database 435.

A rendering module 440 extracts the definition of a selected model from the repository 410. The rendering module 440 creates the graphical representation of the corresponding diagram, and displays it on the monitor of the computer (action "A9.Display"). The rendering module 440 also accesses a color palette 445; the color palette associates different colors with the directly/indirectly impacted artifacts in a lookup table (red for the directly impacted artifacts and yellow with multiple shades for the indirectly impacted artifacts in the example at issue). The rendering module 440 then identifies each directly impacted artifact of the selected model (according to the corresponding report in the database 435) and assigns it the corresponding color (according to the color palette 445); the directly impacted artifact is then highlighted on the monitor in red (action "A10.Highlight direct"). At the same time, the rendering module 440 identifies each indirectly impacted artifact of the selected model and assigns it the corresponding shade of color (according to its indirection index); the indirectly impacted artifact is then highlighted on the monitor in the desired shade of yellow (action "A11.Highlight indirect").

In addition or in alternative, the report database 435 is also accessed by an analyzer 450. For each error, the analyzer 450 calculates the criticality index of each artifact, according to its weight and the correction factor depending on the impact of the error (action "A12.Quantify"). The analyzer 450 aggregates the criticality indexes of all the artifacts into the global criticality index of the error (action "A13.Aggregate"). This information allows a scheduler 455 to optimize the allocation of the available resources for solving the different errors (action "A14.Allocate").

Naturally, in order to satisfy local and specific requirements, a person skilled in the art may apply to the solution described above many modifications and alterations. Particularly, although the present invention has been described with a certain degree of particularity with reference to preferred embodiments) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, the proposed solution lends itself to be used to manage whatever type of errors in any software application. Similar considerations apply if the same idea is implemented with one or more UML models of other type—and then with corresponding artifacts and correlations among them (such as represented with object diagrams, sequence diagrams, activity diagrams, collaboration diagrams, statechart diagrams, and so on); anyway, the reference to the UML language must not be interpreted in a limitative manner (with the proposed solution that may also be implemented with different formalisms, such a based on Petri networks). Moreover, the above-described scenarios are merely illustrative, with the obtained information that may be used in any other way (for example, for reporting purposes only).

It is emphasized that any other representation of the directly/indirectly impacted artifacts is within the scope of the invention; for example, the possibility of providing a textual description thereof (for example, in the XMI language) is contemplated.

Alternatively, equivalent rules may be used to determine the artifacts that are directly impacted by each error (according to the semantic of the relevant models).

In a very simplified implementation of the proposed solution, it is also possible only to trace the objects (and not the corresponding methods) causing the errors. Anyway, nothing prevents applying the same concepts to software applications that are implemented with standard languages (not of the object-oriented type); in this case, the error may relate to whatever module of the software application (such as a subroutine).

Any other technique may be used to select the artifacts to be traced (for example, by means of specific commands available in a menu of the modeler).

Alternatively, it is possible to support the selection of the artifacts to be traced only at the level of models, single artifacts, and the like.

However, this feature is not strictly necessary and it may be omitted in some embodiments of the invention (wherein the proposed solution is applied indiscriminately to all the artifacts).

Similar considerations apply if the directly/indirectly impacted artifacts are highlighted in the diagrams with equivalent visual clues. For example, is it possible to use other colors, different lines, fonts, and the like; moreover, the directly impacted artifacts may be made to blink.

In an alternative embodiment of the invention, the indirection indexes are calculated in another way (for example, by assigning different weights to the correlations); however, nothing prevents managing all the indirectly impacted artifacts in the same way (without any differentiation).

In this case as well, analogous comments apply if the indirection indexes associated with the indirectly impacted artifacts are represented in another way (for example, by means of different colors, numerical labels, and the like).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing device, such as external or resident software, firmware, or microcode (either in object code or in source code). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like.

In any case, the solution according to the present invention lends itself to be implemented with a hardware structure (for example, integrated in a chip of semiconductor material), or with a combination of software and hardware.

Alternatively, the proposed method may be implemented on a computer with a different architecture or that includes equivalent units (such as cache memories temporarily storing the programs or parts thereof to reduce the accesses to the mass memory during execution); more generally, it is possible to replace the computer with any code execution entity (such as a PDA, a mobile phone, and the like).

The invention claimed is:

1. A method for managing errors in software applications, the method including the steps of:
    modeling a software application with a set of models including a plurality of artifacts, each one modeling an aspect of the software application, and a plurality of correlations among the artifacts,
    implementing the software application according to the models, the software application including a plurality of modules each one participating in the implementation of at least one of the artifacts,
    detecting an error in a failing one of the modules, characterized by the steps of
    setting as directly impacted by the error each artifact which implementation is provided by the failing module,
    setting as indirectly impacted by the error each artifact being correlated in the models with at least one directly impacted and/or indirectly impacted artifact, and
    generating a representation of the models with an identification of each directly impacted artifact and each indirectly impacted artifact, wherein the step of generating a representation of the models with an identification of each directly impacted artifact and each indirectly impacted artifact includes:
    displaying a diagram representing a selected one of the models graphically,
    highlighting each directly impacted artifact of the selected model in the diagram with a first visual clue, and
    highlighting each indirectly impacted artifact of the selected model in the diagram with a second visual clue different from the first visual clue.

2. The method according to claim 1, wherein the correlations include collection correlations each one of a parent one of the artifacts collecting at least a dependent one of the artifacts, the method further including the step of:
    setting as directly impacted by the error each artifact collecting at least one directly impacted artifact.

3. The method according to claim 2, wherein the modules consist of objects with corresponding methods and the models include at least one class diagram, in each class diagram the artifacts including classes implemented by the objects and the correlations including exploitation correlations each one of a source one of the classes exploiting at least one method of a target one of the classes, the step of setting as indirectly impacted including:
    setting as indirectly impacted by the error each class exploiting at least one method of at least one directly impacted and/or indirectly impacted class.

4. The method according to claim 3, further including the steps of:
    selecting at least one of the classes, and
    adding tracing code to each selected class automatically, the tracing code being adapted to return an indication of each corresponding method causing the error.

5. The method according to claim 4, wherein the step of selecting at least one of the classes includes:
    selecting one of the parent artifacts, and
    expanding the selected parent artifact into each class collected in the selected parent artifact directly or indirectly.

6. The method according to claim 1, wherein the step of setting as indirectly impacted includes:
    associating an indirection index to each indirectly impacted artifact according to the number of correlations with each directly impacted artifact.

7. The method according to claim 6 includes:
    highlighting each indirectly impacted artifact of the selected model in the diagram with a second visual clue different from the first visual clue; and
    assigning one of a plurality of predefined intensities of the second visual clue to each indirectly impacted artifact according to the corresponding indirection index.

8. A computer program stored in a tangible computer readable storage medium for managing errors in software applications for performing a method when the computer program is executed on a data processing system the method including the steps of:
    modeling a software application with a set of models including a plurality of artifacts, each one modeling an aspect of the software application, and a plurality of correlations among the artifacts;
    implementing the software application according to the models, the software application including a plurality of modules each one participating in the implementation of at least one of the artifacts;
    detecting an error in a failing one of the modules, characterized by the steps of
    setting as directly impacted by the error each artifact which implementation is participated by the failing module,
    setting as indirectly impacted by the error each artifact being correlated in the models with at least one directly impacted and/or indirectly impacted artifact, and
    generating a representation of the models with an identification of each directly impacted artifact and each indirectly impacted artifact, wherein the step of generating a representation of the models with an identification of each directly impacted artifact and each indirectly impacted artifact includes:
    displaying a diagram representing a selected one of the models graphically,
    highlighting each directly impacted artifact of the selected model in the diagram with a first visual clue, and
    highlighting each indirectly impacted artifact of the selected model in the diagram with a second visual clue different from the first visual clue.

9. A system for managing errors in software applications, comprising a processor coupled to a memory that includes instructions that are operable when executed by the processor to perform steps of:
    modeling a software application with a set of models including a plurality of artifacts, each one modeling an aspect of the software application, and a plurality of correlations among the artifacts, implementing the software application according to the models, the software application including a plurality of modules each one participating in the implementation of at least one of the artifacts, detecting an error in a failing one of the modules, characterized by the steps of:

setting as directly impacted by the error each artifact which implementation is participated by the failing module, setting as indirectly impacted by the error each artifact being correlated in the models with at least one directly impacted and/or indirectly impacted artifact, and generating a representation of the models with an identification of each directly impacted artifact and each indirectly impacted artifact, wherein the step of generating a representation of the models with an identification of each directly impacted artifact and each indirectly impacted artifact includes:

displaying a diagram representing a selected one of the models graphically, highlighting each directly impacted artifact of the selected model in the diagram with a first visual clue, and highlighting each indirectly impacted artifact of the selected model in the diagram with a second visual clue different from the first visual clue.

10. The system according to claim 9, wherein the correlations include collection correlations each one of a parent one of the artifacts collecting at least a dependent one of the artifacts, the method further including the step of:

setting as directly impacted by the error each artifact collecting at least one directly impacted artifact.

11. The system according to claim 10, wherein the modules consist of objects with corresponding methods and the models include at least one class diagram, in each class diagram the artifacts including classes implemented by the objects and the correlations including exploitation correlations each one of a source one of the classes exploiting at least one method of a target one of the classes, the step of setting as indirectly impacted including:

setting as indirectly impacted by the error each class exploiting at least one method of at least one directly impacted and/or indirectly impacted class.

12. The system according to claim 11, further including the steps of:

selecting at least one of the classes, and adding tracing code to each selected class automatically, the tracing code being adapted to return an indication of each corresponding method causing the error.

13. The system according to claim 12, wherein the step of selecting at least one of the classes includes:

selecting one of the parent artifacts, and expanding the selected parent artifact into each class collected in the selected parent artifact directly or indirectly.

14. The system according to claim 9, wherein the step of setting as indirectly impacted includes:

associating an indirection index to each indirectly impacted artifact according to the number of correlations with each directly impacted artifact.

15. The system according to claim 14 includes:

highlighting each indirectly impacted artifact of the selected model in the diagram with a second visual clue different from the first visual clue; and assigning one of a plurality of predefined intensities of the second visual clue to each indirectly impacted artifact according to the corresponding indirection index.

* * * * *